W. C. SCHWAB.
CONTAINER FOR SOAP.
APPLICATION FILED JULY 24, 1918.

1,309,965. Patented July 15, 1919.

INVENTOR,
William C. Schwab,
BY J. W. Bond
ATTORNEY

UNITED STATES PATENT OFFICE.

WILLIAM C. SCHWAB, OF CANTON, OHIO.

CONTAINER FOR SOAP.

1,309,965.  Specification of Letters Patent.  Patented July 15, 1919.

Application filed July 24, 1918. Serial No. 246,465.

*To all whom it may concern:*

Be it known that I, WILLIAM C. SCHWAB, a citizen of the United States, residing at Canton, in the county of Stark and State of Ohio, have invented a new and useful Container for Soap, of which the following is a specification.

This invention relates to containers for soap, commonly known as soap dishes, the object being to construct a receptacle of this class that can be quickly and easily attached to any ordinary sink, bath tub or wash basin.

Another object is to construct a device of this class in such a way that when attached to a sink, tub or the like, the water drained from the cake of soap after it has been used and placed in the soap dish, will run into the sink or tub.

A still further object is to construct a container of this character to elevate the cake above the bottom surface of the dish, so that the water draining from the said cake of soap after it has been used can pass freely beneath the said cake and to provide grooves or depressions extending across the bottom of said soap dish to allow the water falling upon the bottom of the soap dish to drain back into the dish or tub to which the dish is attached.

With these objects in view the invention consists in the novel construction and arrangements of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings.

Similar numerals of reference indicate corresponding parts throughout the several figures of the drawing, in which—

Figure 1:
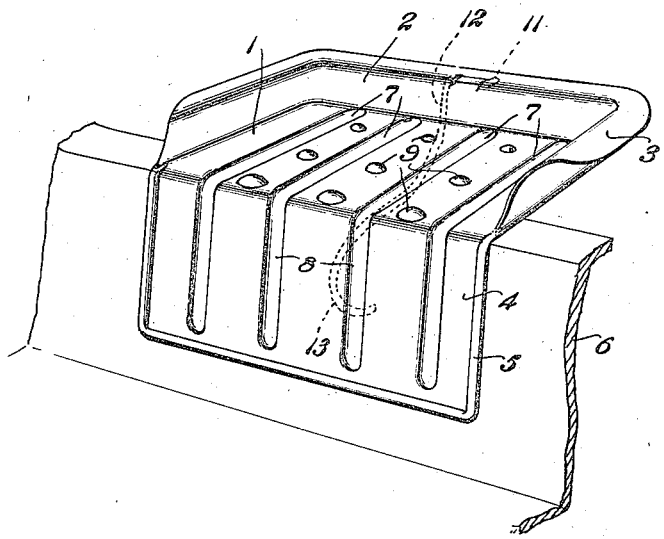
Figure 1 is a perspective view of my improved soap dish shown attached to a fragmentary portion of an ordinary kitchen sink.
Figure 2:
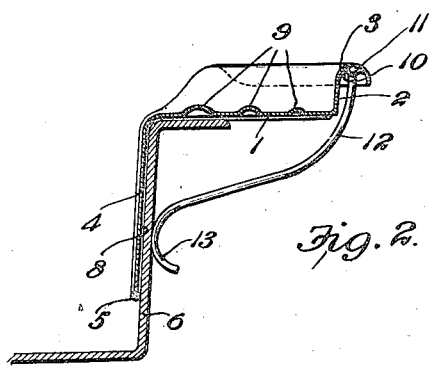
Fig. 2 is a cross sectional view through my soap dish showing the means for attaching it to the sink.

1 indicates the bottom of my soap dish and 2 the rim or flange which is rolled as at 3. The flange 2 extends around the sides and back of my improved soap dish as clearly shown in Fig. 1, the front of the dish being opened and having a depending portion or apron 4 which is the full width of the bottom of the dish, the said apron having a bead or rounded portion 5 formed upon its two sides and bottom edge. This apron 4 as shown is designed to extend downwardly into the sink or tub indicated at 6, and to lie against the side portion of the said sink or tub as shown in Fig. 2. A series of transverse grooves or depressions 7 are formed in the bottom of the dish and connect with similar depressions 8 formed in the apron 4, the object of the said grooves 7 and 8 being to guide the water drained from a wet cake of soap placed in the dish, down into the sink or tub. Intermediate the grooves 7 I form a series of raised portions 9 9, which raised portions are graduated in height, as clearly shown in Fig. 2, the larger of the raised portions being adjacent the front edge of the bottom of the dish and the smaller at the rear thereof. These raised portions are designed to support the cake of soap away from the bottom of the dish so that the bottom of the said cake of soap may dry as the water is drained therefrom, the object in forming the raised portions of graduated heights, the highest of said portions being at the front, is to tilt the cake of soap slightly toward the back of the dish and thus prevent it from slipping into the sink or tub.

Formed in the roll 3 at approximately the center of the back flange 2 of the dish, is a down struck tongue portion 10 through which I insert one end of a piece of spring wire and then bend the said end at right angles as shown at 11. At the opposite end of the tongue portion the wire is bent downwardly as at 12, and thence curves forwardly and terminates in a hooked portion 13. Being formed of spring wire as above stated, a tension will be exerted to hold the hooked portion 13 in contact with the rear side of the apron 4, and when it is desired to attach the soap dish to the side of a sink, tub, wash basin or the like, the hook portion 13 is pulled downwardly, the apron fitting against the side of the sink and the hook released and allowed to spring back to place against the outside of the sink as shown in Fig. 2 and thus position the soap dish.

Having fully described my invention, what I claim as new and desire to secure by Letters Patent, is—

1. In a soap dish, the bottom portion and an apron depending from said bottom portion, grooves formed in said bottom portion of said apron, raised portions intermediate said grooves in said bottom portion, said raised portions being designed to hold a cake of soap away from contact with said bottom portion, means for attaching said soap dish to a sink, tub or the like, the said depending apron within the said sink or tub, the said grooves being designed to convey water from the cake of soap to the sink or tub.

2. A soap dish comprising a bottom portion and an integral depending apron, a series of grooves in said bottom portion and a series of grooves formed in said apron communicating with said first grooves, a series of raised portions intermediate said first grooves, said raised portions being graduated in size, the highest of said raised portions being adjacent said apron, said graduated raised portions being designed to receive a cake of soap and to elevate said cake of soap away from said bottom portion and prevent said cake of soap from slipping from said bottom portion, the said apron being adapted to lie against the inner surface of a sink or tub and to coöperate with means for securing the soap dish in position upon the said sink or tub.

In testimony that I claim the above, I have hereunto subscribed my name.

WILLIAM C. SCHWAB.